(No Model.)

J. COOPER & T. PATTINSON.
PISTON.

No. 501,560.  Patented July 18, 1893.

Witnesses.
Leocadia M. Lennan
William K. Palmer

Inventors.
John Cooper
Thomas Pattinson
By
Edward P. Thompson
Atty.

UNITED STATES PATENT OFFICE.

JOHN COOPER AND THOMAS PATTINSON, OF SHEFFIELD, ENGLAND.

PISTON.

SPECIFICATION forming part of Letters Patent No. 501,560, dated July 18, 1893.

Application filed June 29, 1892. Serial No. 438,396. (No model.) Patented in England September 18, 1890, No. 14,741, and in Germany October 18, 1891, No. 59,326.

*To all whom it may concern:*

Be it known that we, JOHN COOPER and THOMAS PATTINSON, subjects of the Queen of Great Britain, residing at Sheffield, in the county of York, England, have invented certain new and useful Improvements in Pistons, (for which we have obtained Letters Patent in Great Britain, No. 14,741, bearing date September 18, 1890, and in Germany, No. 59,326, dated October 18, 1891,) of which the following is a specification.

Our invention relates to pistons for steam-engines, air pumps, compressors, gas and similar engines and piston valves, and consists in an improved construction of springs for forcing the piston rings outward and against the junkrings or ends of the piston. One frequently used kind of piston spring consists of a helical spring coiled circularly or elliptically and bent round inside the piston rings so that its ends meet, which spring presses against the inclined surfaces of tapered or conical flanges on the piston rings and thereby forces said rings against the junkrings or ends of the piston and also outward. It has been found that in course of time these springs wear grooves into the inclined surfaces of the piston rings which in that case will no longer be forced outward against the ends so effectually as when new, and also that the springs themselves become worn thin at the points of contact with the rings and lose their strength.

The object of our invention is to remedy this defect, which we attain by giving to the springs such a form that they bear against the inclined surfaces of the piston rings on their entire width or nearly so.

Figure 1:
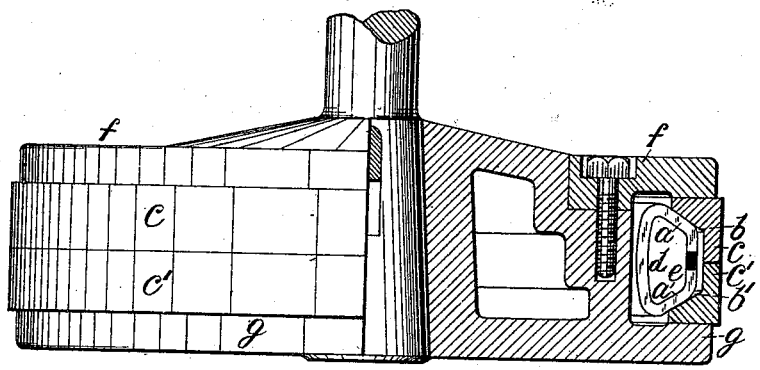
Figure 3:
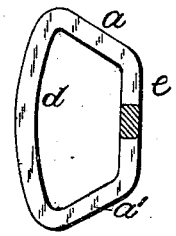
Figure 2:
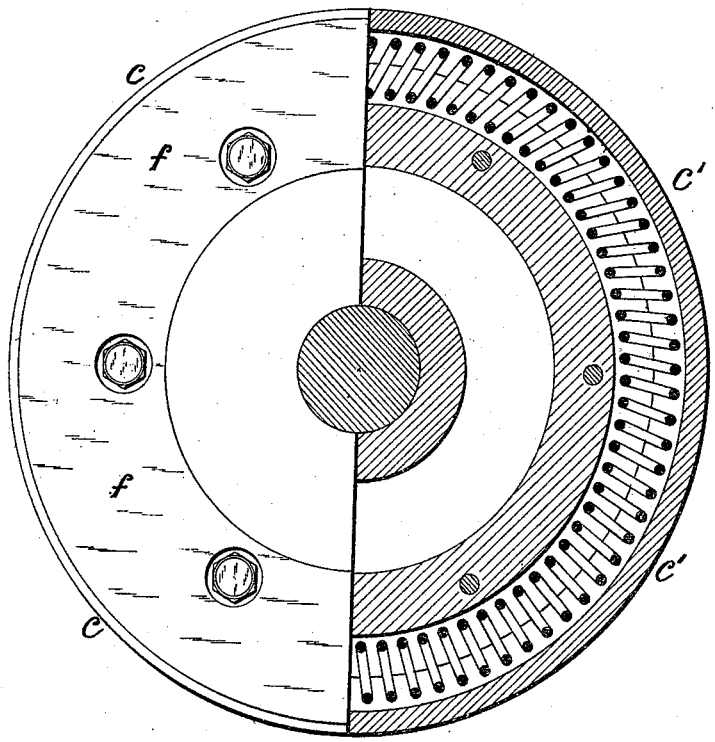
Figure 4:
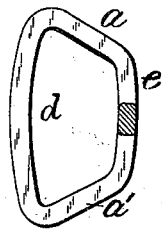
Figure 5:
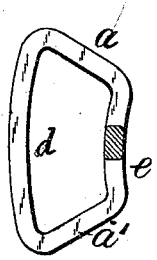
Figure 6:
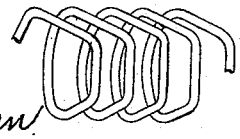

On the sheet of drawings appended hereunto Figure 1. shows a piston partly in section and partly in elevation; Fig. 2, a half plan partly in section of a piston fitted with our improved spring; Figs. 3, 4 and 5 show radial sections of the coiled spring in three modifications; Fig. 6 a view of a portion of spring and Fig. 7 a modified view showing the piston rings with two additional flanges.

In carrying out our invention we first coil the spring wire or rod helically round a mandrel having approximately the form the coils are to obtain and then press the coil to the required form so as to have two flat sides $a\,a'$ inclined toward each other at the same angle at which the inclined or conical surfaces $b, b'$, of the flanges of the piston rings $c$ and $c'$ are inclined toward each other. The inner side $d$ of the coil is preferably made convex, and the outer side $e$ may be flat or straight as shown by Fig. 3, or slightly convex as shown by Fig. 4, or slightly concave as shown by Fig. 5. We make the flat sides $a$ and $a'$ of such length that when the coil thus formed is bent round circularly inside the piston rings, they will bear against the inclined or conical surfaces of the flanges over nearly their entire width without touching the cylindrical part of the piston rings $c$ and $c'$ and thus force the rings outward and endwise against the junkring $f$ and piston end $g$. The wearing of grooves in the flanges $b$ and $b'$ is prevented by this improved arrangement or form of spring, while the spring has a large bearing surface against the flanges of the piston rings and will not be worn thin or through like circularly or elliptically coiled springs. The spring is also held more securely in its position and the coil cannot turn partly round as occurs at times with oval coils.

Figure 7:
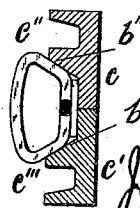

Instead of making the piston rings $c, c'$ with only one flange they may be made with an additional flange each $c''$, $c'''$, as shown by Fig. 7 this construction being preferable where the rings are deep.

It will be understood that the improved form of coil is applicable to piston springs formed of a single wire or rod as well as to those formed of two or more wires coiled together. The spring in our invention has a very broad surface on the inclined side of the packing rings and by means of this broad surface each packing ring tends to slide on the inclined surface of the spring independently of the other. Should any inequality exist on the internal periphery of the cylinder in which the piston moves each ring would be pushed in independently as it passed such inequality. By reason of the interposition of a rigid tube between the spring and packing rings, the inequality would so act on each ring in turn as to cause one to tilt or exert a twisting action on the other and thus derange the alignment of the outer surface of the rings in relation to the walls of the cylinder.

What we claim as our invention, and desire to protect by Letters Patent, is—

1. A spring for the pistons of steam engines, air pumps, compressors and the like formed of a coil the upper and lower members of which are inclined to each other to form surfaces which bear against corresponding surfaces on the piston rings while the back and front or inner and outer members of the coil are respectively convex and straight or flat. substantially as described and for the purpose set forth.

2. A piston spring formed of a coil the upper and lower members of which are inclined to each other to form surfaces which bear against corresponding surfaces on the piston rings while the back and front or inner and outer members of the coil are respectively convex in opposite directions substantially as described and shown and for the purposes set forth.

3. A piston spring formed of a coil the upper and lower members of which are inclined to each other to form surfaces which bear against corresponding surfaces on the piston rings while the back and front or inner and outer members of the coil are respectively formed convex in the same direction substantially as described and shown and for the purposes set forth.

4. The combination with piston rings whose inner flanged surfaces are inclined toward each other, of a spring each of whose coils has two opposite sides parallel to and in contact with said surfaces, and whose side opposite said rings is curved toward the center of the piston.

5. In a piston the combination of piston rings having tapering or conical flanges with a helically coiled spring with coils having two flat sides inclined toward each other at the same angle at which the inclined or conical surfaces of the said flanges are inclined toward each other, substantially as hereinbefore described and for the purposes set forth.

6. In a piston the combination of piston rings $c, c'$ having conical or inclined faces $b, b'$ with a helically coiled spring the upper and lower members $a$ and $a'$. of which are inclined toward each other at the same angle as the conical or inclined faces $b, b'$. of the piston rings $c, c'$ are inclined substantially as described and shown.

7. In a piston the combination of piston rings $c, c'$ having conical or inclined faces $b, b'$ helically coiled spring having inclined members $a, a'$ convex members $d$ and straight or convex members $e$, junk ring $f$, and piston block or body formed with a flange $g$ substantially as described and shown and for the purposes set forth.

8. In a piston the combination of piston rings $c, c'$ formed with additional flanges $c'' c'''$ having inclined faces $b'' b'''$ of a helically coiled spring the upper and lower members of which are inclined toward each other substantially as described and shown.

9. The combination with piston rings whose inner flanged surfaces are inclined toward each other, of a spring each of whose coils has two opposite sides parallel to and in contact with said surfaces.

In testimony whereof we have signed our names to this specification in the presence of two subscribing witnesses.

JOHN COOPER.
THOMAS PATTINSON.

Witnesses:
HENRY BARLOW MILLS,
CHARLES FREDERIC PATTINSON.